United States Patent
Hayes et al.

[11] Patent Number: 5,321,077
[45] Date of Patent: Jun. 14, 1994

[54] POLYMER POLYOL COMPOSITION CONTAINING A GRAFTED POLYOL-POLYACRYLATE DISPERSANT

[75] Inventors: John E. Hayes, Wilmington, Del.; Robert G. Gastinger, West Chester, Pa.

[73] Assignee: Arco Chemical Technology, L.P., Wilmington, Del.

[21] Appl. No.: 962,953

[22] Filed: Oct. 16, 1992

Related U.S. Application Data

[60] Division of Ser. No. 789,215, Nov. 7, 1991, Pat. No. 5,194,493, which is a continuation of Ser. No. 366,997, Jun. 16, 1989, abandoned.

[51] Int. Cl.$^5$ ............ C08L 71/02; C08L 75/08
[52] U.S. Cl. .................. 525/63; 525/123; 525/124; 525/127; 525/131; 525/403; 525/404; 525/408; 525/409; 525/418; 525/451; 525/452; 525/453; 525/454; 525/460; 525/528; 525/530; 525/532
[58] Field of Search ............ 525/63, 107, 108, 123, 525/124, 238, 241, 127, 532, 131, 124, 403, 404, 408, 409, 418, 451, 452, 453, 454, 460, 528, 530

[56] References Cited

U.S. PATENT DOCUMENTS

| | | | |
|---|---|---|---|
| 4,390,645 | 6/1983 | Hoffman et al. | 521/137 |
| 4,460,715 | 7/1984 | Hoffman et al. | 521/137 |
| 4,745,153 | 5/1988 | Hoffman | 524/762 |
| 5,194,493 | 3/1993 | Hayes et al. | 525/63 |

Primary Examiner—James J. Seidleck
Assistant Examiner—W. R. H. Clark
Attorney, Agent, or Firm—Jonathan L. Schuchardt; Stephen D. Harper

[57] ABSTRACT

A polymer polyol composition comprising a continuous phase, a disperse phase within the continuous phase, and a dispersant to enhance the stability of the polymer polyol is disclosed. The dispersant is a grafted polyol-polyacrylate dispersant comprised of a isocyanate vinyl monomer/ethylenically unsaturated monomer random copolymer and a polyoxyalkylene polyether, wherein the random copolymer and the polyoxyalkylene polyether are connected through at least one urethane graft site.

Methods of preparing the polymer polyol composition and the grafted polyol-polyacrylate dispersant are provided. The polymer polyol compositions have low viscosities as well as high stability and may be prepared with high levels of dispersed vinyl polymer and high styrene:acrylonitrile ratios in the dispersed vinyl polymer. The polymer polyol compositions are useful for the preparation of polyurethanes, particularly polyurethane foams.

11 Claims, No Drawings

POLYMER POLYOL COMPOSITION CONTAINING A GRAFTED POLYOL-POLYACRYLATE DISPERSANT

This is a division of application Ser. No. 07/789,215, filed Nov. 7, 1991, now U.S. Pat. No. 5,194,493, which is a continuation of application Ser. No. 07/366,997, filed Jun. 16, 1989, now abandoned.

BACKGROUND OF THE INVENTION

This invention relates to polymer polyol compositions useful as intermediates in the preparation of polyurethanes. More specifically, this invention pertains to polymer polyol compositions containing grafted polyol-polyacrylate dispersants. The grafted polyol-polyacrylate dispersants may be obtained by copolymerizing isocyanate vinyl monomers and acrylate monomers and then reacting the resulting copolymers with polyoxyalkylene polyols.

In one of its more specific aspects, this invention relates to the incorporation of grafted polyol-polyacrylate dispersants into polymer polyol compositions for the purpose of improving the stability of the dispersed vinyl polymer particles contained in the polymer polyol compositions. The stabilized polymer polyol compositions have relatively low viscosity and small average particle size.

Polymer polyols containing vinyl polymer particles dispersed in a continuous polyoxyalkylene polyol phase are well known. Also well known is the tendency of polymer polyols to undergo phase separation if they are not stabilized. Hence, polymer polyols are commonly stabilized against phase separation by the addition of a polymeric dispersant during preparation of the dispersion.

U.S. Pat. No. 4,745,153 teaches a dispersant formed by copolymerizing a vinyl-terminated polyol adduct with an ethylenically unsaturated monomer. A polymer polyol is then prepared by reacting an ethylenically unsaturated monomer, the dispersant, and a base polyol under free radical polymerization conditions.

U.S. Pat. Nos. 4,390,645 and 4,460,715 teach the use of a preformed dispersant prepared by reacting an ethylenically unsaturated isocyanate with a polyoxyalkylene polyol using a very low NCO: active hydrogen molar ratio, and then copolymerizing the monovinyl adduct thus obtained with a styrene/acrylonitrile mixture.

U.S. Pat. Nos. 4,148,840 and 4,242,249 teach the use of certain preformed polymer polyols as suitable dispersant stabilizers. U.S. Pat. Nos. 4,327,005 and 4,334,049 teach that alkylene oxide adducts of styrene/allyl alcohol copolymers can be used as polymer polyol dispersants.

Although polymer polyols prepared by prior art methods have enjoyed widespread commercial use in the polyurethane industry due to the beneficial properties which they impart to polyurethane foams, the need for further improvement in certain properties of the available polymer polyols has been recognized. Improved stability is desirable since the time period during which a polymer polyol can be stored before significant settling of the dispersed vinyl polymer particles occurs would thereby be increased. In addition, lowering the viscosity of a polymer polyol composition would reduce the handling problems encountered during processing and use of the composition. Small particle size is also desirable since plugging and fouling of processing equipment would be minimized.

Polymer polyols are commonly prepared using a mixture of styrene and acrylonitrile to form the dispersed vinyl polymer particles. It is widely recognized that increasing the ratio of styrene to acrylonitrile is beneficial since the substitution of styrene for acrylonitrile helps prevent discoloration when the polyurethane is cured and also improves the flame retardant properties of polyurethane products. However, this substitution is typically difficult to accomplish since the stability of the polymer polyols decreases with increasing styrene to acrylonitrile ratios. Viscosity and particle size are also often adversely affected by high styrene content.

Increasing the concentration of vinyl polymer dispersed in a polymer polyol is acknowledged to result in certain improvements in polyurethane properties, most notably the load bearing properties. Furthermore, the production of a polymer polyol having a high vinyl polymer level is economically attractive since the resulting product can be readily diluted after preparation to a lower solids level with additional base polyol. Thus, a larger volume of polymer polyol containing a conventional amount of dispersed vinyl polymer can be produced using existing equipment. However, increasing the vinyl polymer content of a polymer polyol generally leads to increased viscosity and lower dispersion stability using prior art methods.

Clearly, there is a need for improved dispersants capable of providing stable, low viscosity polymer-polyol compositions especially when such compositions have high concentrations of dispersed solids or high styrene/acrylonitrile ratios.

SUMMARY OF THE INVENTION

This invention affords a dispersant suitable for enhancing the stability of a polymer polyol composition. The dispersant is a grafted polyol-polyacrylate dispersant comprised fo an isocyanate vinyl monomer/acrylate monomer random copolymer and a polyoxyalkylene polyether. The random copolymer and polyoxyalkylene polyether are connected through a urethane graft site.

This invention additionally provides a method for producing such a dispersant. An isocyanate vinyl monomer and an acrylate monomer are reacted in the presence of a free radical polymerization initiator to form a random copolymer. The copolymerization is carried out in a manner such that the isocyanate groups of the isocyanate vinyl monomer are predominantly unreacted. The random copolymer is then reacted with a polyoxyalkylene polyol in the presence of a urethane-forming catalyst so as to accomplish substantially complete reaction of the isocyanate groups with the hydroxy groups of the polyol.

According to this invention, there is also provided a stable polymer polyol composition comprising a continuous phase, a disperse phase within the continuous phase, and a dispersant. The disperse phase is comprised of vinyl polymer particles while the continuous phase is comprised of a polyoxyalkylene polyol. The dispersant, having the composition described above, is present in an amount effective to enhance the stability of the resulting polymer polyol composition as compared to the stability of the composition in the absence of the dispersant.

In addition, this invention affords a method of producing such a polymer polyol composition. The method comprises reacting the dispersant, a polyoxyalkylene polyol, and one or more vinyl monomers in the presence of a free radical polymerization initiator.

DETAILED DESCRIPTION OF THE INVENTION

The dispersants of the present invention are prepared by copolymerizing an isocyanate vinyl monomer and an acrylate monomer in the presence of a free radical polymerization initiator. The monomers are preferably incorporated in a substantially random fashion into the resulting copolymer. The monomers react primarily through the carbon-carbon double bond present in each monomer.

The isocyanate vinyl monomer may be any monomer containing at least one vinyl functional group (i.e., a carbon-carbon double bond capable of polymerizing in a free radical manner) and at least one isocyanate functional group. It is preferred that the isocyanate functional group(s) be hindered. The term hindered isocyanate in this context is meant to signify an isocyanate (—NCO) group which is normally substantially unreactive with an active hydrogen functional group (for example, the hydroxyl group of a polyol) in the absence of a urethane-forming catalyst. In other words, the structure of the hindered isocyanate vinyl monomer preferably is such that no substantial reaction of the isocyanate group takes place during the copolymerization with the acrylate monomer. In general, it is desirable that less than about 25% conversion of the isocyanate takes place during copolymerization. One way to lower the reactivity of the isocyanate group is to have substituents in close proximity to the isocyanate group which sterically interfere with the approach of an active hydrogen group to the isocyanate group. Alternatively, substituents on the vinyl isocyanate monomer can be varied to influence the reactivity of the isocyanate group by virtue of the inductive effects attributable to those substituents.

Suitable hindered isocyanate vinyl monomers may have the following general structure (1):

STRUCTURE 1

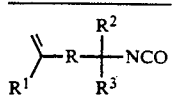

wherein R is a divalent hydrocarbon radical, $R^1$ is hydrogen or methyl, and $R^2$ and $R^3$ separately represent a monovalent hydrocarbon radical. For example, R may be an aromatic ring or an aliphatic chain. The aromatic ring or aliphatic chain may bear additional substituents, as long as such substituents do not interfere with the desired reactivity of the vinyl or isocyanate groups. $R^2$ and $R^3$ may be methyl, ethyl, phenyl, or any other group which provides sufficient steric hindrance to make the isocyanate group substantially unreactive towards an active hydrogen group under uncatalyzed reaction conditions.

(1,1-Dialkyl-1-isocyanatomethyl) vinyl aromatic monomers, are one class of hindered isocyanate vinyl monomers particularly suitable for use in this invention. Shown below is (1,1-dimethyl-1-isocyanatomethyl)-m-isopropenyl benzene (also known as TMI), a preferred hindered isocyanate vinyl monomer since it is available commercially.

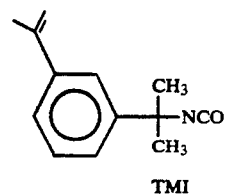

TMI

Aromatic isocyanate monomers of Structure 2 are also useful in this invention, where $R^1$, $R^2$, and $R^3$ have the same meaning as in Structure 1. In this embodiment, the isocyanate group is hindered by adjacent substituents on the aromatic ring.

STRUCTURE 2

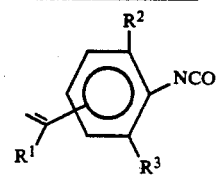

The acrylate monomer which is copolymerized with the hindered isocyanate vinyl monomer in the present invention may be any ester of acrylic acid which is polymerizable in a free radical manner.

The preferred acrylate monomers are the $C_1$ to $C_5$ alkyl esters of acrylic acid. Specific examples of suitable acrylates include methyl acrylate, ethyl acrylate, propyl acrylate, isopropyl acrylate, t-butyl acrylate, sec-butyl acrylate, isobutyl acrylate, n-butyl acrylate, and the like, and their mixtures. The most preferred acrylate monomer is n-butyl acrylate.

Other ethylenically unsaturated monomers such as methacrylates, monovinyl aromatic monomers, unsaturated nitriles, and the like can be used in combination with the acrylate monomer, although it is preferred that such mixtures contain at least about 75 mole percent of one or more acrylate monomers. It has surprisingly been found that a high proportion of acrylate monomer in the random copolymer yields a copolymer which is highly soluble in the polyoxyalkylene polyol component of the dispersant. This solubility permits the reaction of the isocyanate groups on the copolymer with the polyol hydroxyl groups to proceed much more readily than if two phases are present. In addition, the high polyoxyalkylene polyol solubility of random copolymers containing high proportions of acrylate monomer permits such copolymers to achieve significantly higher average molecular weights while still remaining soluble than is possible using monomers such as styrene or acrylonitrile. A higher molecular weight will mean that, for a given concentration of isocyanate vinyl monomer, an individual copolymer chain will on average contain a greater number of isocyanate groups available for reaction with the polyol hydroxyl groups. Thus, a high degree of grafting will be present in the dispersant of this invention. As a result, a relatively large fraction of the dispersant (preferably, greater than about 10 percent) has a GPC number average molecular weight (relative to polypropylene glycol calibration standards) of more than about 100,000. Without intending to limit the invention to a particular theory, it is believed that this feature of the dispersants of this invention contributes to their superior effectiveness as polymer polyol stabilizers in high solids and high styrene compositions.

Although any weight ratio of isocyanate vinyl monomer to ethylenically unsaturated monomer may be used to prepare the random copolymer, it is preferred that the ratio be from about 0.5:99.5 to 50:50. For reasons of economy and to prevent excessive cross-linking of the dispersant, it is desirable that the proportion of isocyanate vinyl monomer be fairly low. However, in order that a sufficient number of isocyanate functional groups be present in the random copolymer to provide an adequate degree of grafting in the dispersant, the amount of isocyanate vinyl monomer used must not be too small. For these reasons, the most preferred isocyanate vinyl monomer: ethylenically unsaturated monomer ratio is from about 2:98 to 35:65.

The random copolymers of this invention can be prepared by alternative methods. In one method, the in situ method, the random copolymer is obtained by copolymerizing the isocyanate vinyl monomer (preferably, a hindered isocyanate vinyl monomer) and the acrylate monomer in the presence of a polyoxyalkylene polyol and a free radical polymerization initiator. To form the grafted polyol-polyacrylate dispersant, the random copolymer and the polyol are reacted in the presence of a urethane-forming catalyst.

In another method, the blend method, the random copolymer is formed by polymerizing the acrylate and isocyanate vinyl monomers in the presence of an organic solvent and a free radical polymerization initiator, but without the polyoxyalkylene polyol. The solvent keeps the reaction mixture fluid and stirrable. The random copolymer is then blended with the polyol and reacted using a urethane-forming catalyst to yield a dispersant of this invention.

Of these two methods, the in situ method is preferred as it is simpler to execute in commercial practice and does not require the use of a solvent which would need to be recovered at some later point in the process.

Regardless of the method chosen, the monomers comprising the random copolymer may be reacted using conditions well-known to those skilled in the art of free-radical polymerization. The entire amount of the monomers may be charged to a suitable reactor vessel before polymerization is initiated or, alternatively, the monomers may be added in a continuous fashion while polymerization is in progress. If the monomers are significantly different in reactivity, it may be desirable to charge all or most of one monomer to the vessel before initiation and to add all or most of the other more reactive monomer(s) to the mixture after initiation.

The copolymerization may be carried out at any suitable temperature; the temperature range of from about 60° to 150° C. is generally preferred. If the in situ method is used, the reaction temperature should not be so high as to cause substantial reaction of the isocyanate with the polyol hydroxyl groups.

Suitable free-radical polymerization initiators useful in producing the random copolymers of this invention are the free radical type of vinyl polymerization initiators, such as the peroxides, persulfates, perborates, percarbonates, azo compounds, and the like. Specific examples include, but are not limited to, 2,2'-azobis-(isobutyronitrile) (AIBN), 2,2'-azobis(2-methyl butyronitrile), dibenzoyl peroxide, lauroyl peroxide, di-t-butyl peroxide, diisopropyl peroxide carbonate, t-butyl peroxy-ethylhexanoate, t-butylperpivalate, 2-5-dimethyl-hexane-2,5-di-per-2-ethyl hexoate, t-butyl perneodecanoate, t-butylperbenzoate, t-butyl percrotonate, t-butyl perisobutyrate, and di-t-butyl perphthalate. Other suitable initiators or mixtures of initiators may be employed, of course. The concentration of initiator is not critical, but will typically vary within wide limits of from about 0.1 to about 5.0 weight percent based on the total weight of monomer. Chain transfer agents may also be used to control the molecular weight of the random copolymer, although they are generally not needed due to the inherently high solubility of the random copolymers of this invention.

A random copolymer prepared using the procedures described above is reacted with a polyoxyalkylene polyol in the presence of a urethane-forming catalyst to yield a dispersant of this invention. The dispersant will have a graft-type structure as a result of the isocyanate/polyol hydroxy reaction in which segments of random copolymer are connected to polyoxyalkylene polyether segments through urethane graft sites. Each graft site comprises a urethane bond

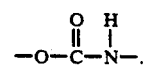

The dispersant may contain graft polymer consisting of one segment of the random copolymer connected to one or more segments of polyoxyalkylene polyether derived from the polyoxyalkylene polyol. The grafted polyol-polyacrylate dispersant thus can have a "comb" structure, with several polyoxyalkylene polyether segments grafted onto a backbone consisting of the random copolymer segment.

Cross-linking results when more than one end of a polyoxyalkylene polyol reacts with isocyanate groups on separate random copolymer segments. The grafted polyol-polyacrylate thus formed is comprised of at least two segments of the random copolymer and at least one segment of polyoxyalkylene polyether derived from the polyol. The polyoxyalkylene polyether segment thereby forms a bridge between at least two segments of the random copolymer; each of at least two ends of the bridge is attached to a random copolymer segment by a urethane bond. The dispersant of this invention thus can be a mixture of cross-linked polymers containing different numbers of connected random copolymer and polyoxyalkylene polyether segments. An individual dispersant polymer chain, for example, may have two, three, four, or more polyoxyalkylene polyether segments. Some of these segments may not be attached at each end to a random copolymer segment. Since the polyoxyalkylene polyol used may be a triol, as described below, it is possible for one polyoxyalkylene polyether segment to be attached at each of three ends to three different random copolymer segments. At the same time, an individual dispersant polymer chain may contain more than two random copolymer segments, each of which is attached to a polyoxyalkylene polyether segment by a urethane bond. Thus, the dispersant of this invention can have a highly branched structure and may be considerably higher in molecular weight than the molecular weight of either the random copolymer or the polyoxyalkylene polyether polyol.

The polyoxyalkylene polyols most suitable for use in the preparation of the dispersant of this invention are the polymerization products of an alkylene oxide or a mixture of alkylene oxides. The functionality of the polyol should be at least about one, but can be varied as desired by changing the structure of the active hydrogen containing initiator or by any other means known in the art. Diols and triols are particularly preferred. Suitable alkylene oxides include, but are not limited to, ethylene oxide, propylene oxide, 1,2-butylene oxide, and the like. Propylene oxide polyols and propylene oxide/ethylene oxide copolyols (either random or endcapped) are most preferred. The polyoxyalkylene polyether polyols may be prepared by any of the methods well-known to those skilled in the art and may contain small amounts of unsaturation. Polyoxyalkylene polyols in which the terminal hydroxyl groups have been replaced with primary or secondary amine groups or with other active hydrogen moieties are also suitable for use in this invention. The number average molecular weight of the polyoxyalkylene polyol is preferably between about 1000 and 10,000 and most preferably is from about 2000 to 7000.

The urethane-forming catalyst used to prepare the dispersant may be any organic or metal-containing compound which catalyzes the reaction of an isocyanate with an active hydrogen group. Suitable urethane-forming catalysts include, but are not limited to, tin carboxylates, dialkyl tin dicarboxylates, tertiary amines, organotin compounds, dialkyltin mercaptides, dialkyltin thioesters, and the like, and mixtures thereof. The amount of urethane-forming catalyst used is not critical and will vary depending on the catalyst used, the structure of the isocyanate and active hydrogen groups, as well as other reaction conditions such as temperature. In general, urethane-forming catalyst concentrations of from about 1 ppm to 1.0 weight percent are suitable.

Any conditions sufficient to accomplish substantially complete reaction of the isocyanate groups on the random copolymer may be employed. It is not critical that the isocyanate groups be quantitatively reacted. In general, about 0-20 percent of the isocyanate groups may remain unreacted in the dispersant obtained. Typically, the reaction temperature may be from about 50° to 150°. The reaction may be carried out in the presence of an inert organic solvent.

The weight ratio of random copolymer to polyoxyalkylene polyol is preferably in the range of from about 5:95 to 50:50. Normally the proportion of isocyanate vinyl monomer in the random copolymer and the proportion of random copolymer in the polyol will be adjusted so that the percent isocyanate (% NCO) in the random copolymer/polyoxyalkylene polyol mixture immediately prior to dispersant formation is from about 0.05 to 1.0 weight percent or, most preferably, from about 0.2 to 0.6 weight percent.

The stable polymer polyol compositions of this invention are comprised of a continuous phase, a disperse phase suspended within the continuous phase, and the dispersant previously described. The continuous phase is a polyoxyalkylene polyol, which may be the same as or different than the polyoxyalkylene polyol used to prepare the dispersant. Suitable polyoxyalkylene polyols useful as the polymer polyol continuous phase include any and all of the polyols usable in the preparation of the dispersant.

The disperse phase is comprised of small vinyl polymer particles. The presence of the grafted polyol-polyacrylate dispersant in the polymer polyols of this invention generally results in an average vinyl polymer particle size of about 3 microns or less. Preferably, the average vinyl polymer particle size is less than about 1 micron. The monomer or monomers comprising the vinyl polymer may be any monomer containing a carbon-carbon double bond which is polymerizable in a free radical manner. Suitable ethylenically unsaturated monomers include, but are not limited to, acrylates and substituted acrylates, monovinyl aromatic monomers including styrene and substituted styrenes, unsaturated nitriles including acrylonitrile, acrylic acid and substituted acrylic acids, conjugated and non-conjugated dienes, vinyl esters, vinyl ethers, allylic alcohols, unsaturated anhydrides, vinyl ketones, maleimide, N-substituted maleimides, as well as mixtures of these compounds. Preferably, however, the vinyl polymer is polystyrene or a styrene/acrylonitrile copolymer. Because of the stability imparted to the polymer polyol composition by the dispersant of this invention, it is possible to prepare polymer polyols of satisfactory storage stability and viscosity which contain high levels of styrene.

In a preferred embodiment of the invention, the weight ratio of styrene to acrylonitrile is from about 25:75 to 99:1. In another preferred embodiment, the vinyl polymer is a homopolymer of styrene.

Any amount of dispersant sufficient to enhance the stability of the polymer polyol as compared to the stability of the composition in the absence of the dispersant is usable. It is preferred that the dispersant be employed in an amount of from about 0.1 to 20 weight percent based on the total weight of the polymer polyol composition. The range of from about 0.5 to 6 weight percent is most preferred.

The weight ratio of the disperse phase to the continuous phase is not critical, but is preferably varied from about 1:19 to 1:1. One of the advantages of the present invention is that polymer polyol compositions containing relatively high levels of vinyl polymer (i.e., over 20% solids) may be obtained which are stable and low in viscosity.

The polymer polyols of this invention may be formed by polymerizing a vinyl monomer or mixture of vinyl monomers in a polyol mixture comprising at least one polyoxyalkylene polyol and a grafted polyol-polyacrylate dispersant of this invention in the presence of one or more free radical initiators at a temperature from about 60° C. to about 150° C. The free radical initiator may be any of the compounds capable of catalyzing the addition polymerization of vinyl monomers. Those initiators described herein as being useful in preparing the random copolymer component of the dispersant are also suitable for use in the vinyl monomer polymerization. The amount of the initiator is not critical, but should be sufficient to effect substantial polymerization of the vinyl monomer(s). Typical conditions for the preparation of polymer polyols are described in U.S. Pat. No. 4,745,153, the teachings of which are incorporated herein by reference in their entirety.

Any conventional process for preparing polymer polyols can be employed including batch, semi-batch, and continuous processes. The preferred process is a semi-batch process in which all or at least a major amount of the dispersant is added in the reactor charge and the major amount of polyol is added in the feed charge. It is most preferred to add all of the dispersant in the reactor charge. If a plurality of continuous stirred tank reactors (CSTR) in series is employed, the charge to the first CSTR preferably includes all or at least the major amount of dispersant. To the second CSTR, in addition to the product feed from the first CSTR, will be added the feed charge containing the major amount of polyol.

After polymerization of the vinyl monomer to form the disperse phase, the polymer polyol composition may be diluted with a polyoxyalkylene polyol to adjust the vinyl polymer content to the desired level. This polyoxyalkylene polyol may be any of the types of polyol described previously as suitable for the preparation of the dispersant, but may be the same as or different than the other polyols employed. Small amounts of additives such as antioxidants may be added to the polymer polyol composition if desired.

The polymer polyol of the present invention may be incorporated into a polyurethane formulation using any of the methods well-known in the art for utilizing polymer polyols. Methods of reacting polymer polyols with polyisocyanates to yield polyurethane products are described, for example, in U.S. Pat. No. 4,785,026, 4,338,408, 4,342,687, 4,381,353, 4,198,488, and 3,383,351. The teachings of these patents are incorporated herein by reference in their entirety. The polymer polyols of this invention are particularly useful for the preparation of slab or high resiliency (HR) flexible polyurethane foams.

Such foams are typically prepared using a blowing agent such as a halocarbon, water, or carbon dioxide, a urethane forming catalyst such as an organotin or tertiary amine compound, and a foam stabilizer such as a silicone surfactant. Other additives such as flame retardants may also be present.

The following examples further illustrate the preparation of the random copolymers, dispersants, polymer polyols and polyurethanes of this invention, but are not limitative of the invention in any manner.

From the foregoing description, one skilled in the art can readily ascertain the essential characteristics of this invention, and, without departing from the spirit and scope thereof, can make various changes and modifications of the invention to adopt it to various usages, conditions, and embodiments. All of these variations are considered to be encompassed by the present invention.

EXAMPLES

Reaction Procedure A

A 3 liter reactor equipped with a stirrer, a condenser, a thermometer, and an addition tube was charged with the reactor charge. The reactor charge was heated to 120° C. under a nitrogen blanket and the feed charge added over a 2.0 hr. period. Upon completion of the addition, the reaction product was held at 120° C. for 30 min and then stripped of residual monomer (1.5 hr.; 120° C.; <5 mm Hg pressure).

Reaction Procedure B

A 2 liter reactor equipped with a stirrer, a condenser, and a thermometer was charged with the reactor charge. The reactor charge was heated to 100° C. under a nitrogen blanket before adding the urethane-forming catalyst. The reaction mixture was stirred for an additional 1 hr. at 100° C.

EXAMPLES 1-9

These examples demonstrate the preparation of random copolymers of n-butyl acrylate (BA) and (1,1-dimethyl-1-isocyanate methyl)-m-isopropenyl benzene (TMI) in polyol media. Procedure A and the amounts, materials, and process conditions identified in Table 1 were used to prepare the copolymers. Base Polyol W was a random triol copolymer of propylene oxide (88 wt. %) and ethylene oxide (12 wt. %) having a hydroxy number of 48 and a number average molecular weight of about 3500. Base Polyol X was a propylene oxide triol capped with 15.5 wt. % ethylene oxide having a hydroxy number of 26 and a number average molecular weight of about 6500. The initiator used was VAZO®67 [azobis(2-methyl butyronitrile), sold commercially by E. I. duPont de Nemours & Co.].

EXAMPLES 10-18

These examples demonstrate the preparation of the dispersants of this invention by the reaction of the random copolymers of Examples 1-9 with the polyoxyalkylene polyols in which they were prepared (the In Situ Method). In this method, the polyol hydroxyl groups react with the isocyanate groups of the random copolymer to form urethane attachment sites. Procedure B was followed; Table 2 shows the charges used and the properties of the resultant dispersants. In Examples 11, 14-16, and 18, the random copolymer/polyol mixtures obtained from Examples 1-9 were diluted with additional base polyol before addition of the urethane-forming catalyst. Two types of urethane-forming catalyst were used: T-9 (stannous octoate; a product of Air Products and Chemicals, Inc.) and UL-1 (an organotin catalyst produced by Witco).

The gelation observed in Example 13 is believed to be at least partially due to the relatively high initial NCO concentration, although this should not be interpreted as an upper limit on the NCO concentration usable in accordance with this invention.

EXAMPLES 19-22

The examples demonstrate the preparation of stable polymer polyols using the dispersants of Examples 10-18. Despite the use of high solids levels and high styrene/acrylonitrile ratios, all of the polymer polyols thus obtained were relatively low in viscosity and had average disperse particle diameters less than 1.0 microns (determined using a Coulter N4 Particle Size Analyzer with o-xylene or isopropyl alcohol as the dispersing medium). The polymer polyols were found to be suitable for use in the preparation of high quality polyurethane foams. The polymer polyols produced were expected to show excellent storage stability, as indicated by the low values obtained for weight Percent Centrifugable Solids. The experimental procedure used to measure Weight Percent Centrifugable Solids is described in U.S. patent application Ser. No. 07/197,938, the teachings of which are incorporated herein by reference. Procedure A was used to prepare the polymer polyols. Table 3 gives the reactant charges used as well as the properties of the polymer polyols. Base Polyol Y was a propylene oxide triol of about 4800 number average molecular weight having a hydroxyl number of 33 and a 14 wt. % ethylene oxide end-cap. The initiator used was VAZO®67.

EXAMPLE 23

This example demonstrates the preparation of a butyl acrylate/TMI random copolymer in an organic solvent medium. Procedure A was used with the following charges:

| Reactor Charge: | Xylene | 100 |
|---|---|---|
| Feed Charge: | Butyl Acrylate | 360 |
| | TMI | 40 |
| | Xylene | 500 |

-continued

| | |
|---|---|
| Vazo ® 67 | 7.5 |

After stripping residual monomer and solvent, the product had a viscosity of 58,000 cps and an isocyanate content of 2.25 wt. %.

EXAMPLE 24

This example demonstrates the preparation of the dispersant of this invention by the Blend Method.

A 2 liter reactor equipped with a stirrer, a condenser, and a thermometer, was charged with 332 grams of Polyol W and 80 grams of the copolymer from Example 23. The mixture was heated to 100° C. under a nitrogen blanket before adding 0.76 grams of T-9 catalyst. The reaction mixture was allowed to stir for an additional 1 hr. at 100° C. The resulting product had a viscosity of 7950 cps, an isocyanate content of less than 0.03 wt %; 22% of the product had a GPC number average molecular weight greater than 100,000.

EXAMPLE 25-26

These examples demonstrate the synthesis of polymer polyols using a dispersant prepared by the Blend Method. Procedure A was used and Table 4 contains the charges and properties of the resultant polymer polyols. VAZO®67 was used as the initiator. The polymer polyol of Example 25 had properties comparable to those of the product obtained in Examples 19-22. Example 26 shows that polymer polyols of satisfactory quality may even be obtained using the dispersant of this invention when only styrene is present in the dispersed vinyl polymer particles, in contrast to the poor results obtained for similar all-styrene compositions produced by known prior art methods.

EXAMPLES 27-30

These examples illustrate the use of the polymer polyols of Examples 19-22 in the preparation of slab polyurethane foams. the polyurethane foams are prepared by charging the amounts of polymer polyol, water, catalyst, and silicone surfactant indicated in Table 5 into a one-liter cylindrical container equipped with a mechanical stirrer. The mixture is stirred at ambient temperature for about 30 seconds at about 2500 rpm before introducing the indicated amount of toluene diisocyanate into the container with stirring. After stirring for about another 10 seconds, the contents of the container are poured into a cardboard cake box and the foam allowed to rise. After the foam rise is completed, the foam is cured at room temperature for about one week.

TABLE 5

| Ingredient | Amount (parts by wt.) |
|---|---|
| Polymer Polyol (From Examples 19-22) | 100 |
| Water | 2.2 |
| L-6202 silicone surfactant[1] | 0.8 |
| Amine[2] | 0.3 |
| T-10 Organotin Catalyst (50% Active)[3] | 0.4 |
| Toluene Diisocyanate | 110 Index |

[1]Available from Union Carbide Corporation.
[2]Prepared by blending 2 parts B11 and 1 part 33LV, both available from Air Products and Chemicals, Inc., and 3 parts Thanol ® F3020, available from ARCO Chemical Company.
[3]Available from Air Products and Chemicals, Inc.

EXAMPLES 31-34

These examples illustrate the use of the polymer polyols of Examples 19-22 in the preparation of slab polyurethane foams containing a flame retardant and a conventional polyoxyalkylene polyol in addition to the polymer polyol (Table 6). The same procedure described in Examples 27-30 is followed.

TABLE 6

| COMPONENT | parts by wt. |
|---|---|
| ARCOL ® 1130 ® | 60 |
| Polymer Polyol (From Examples 19-22) | 40 |
| Water | 4.2 |
| Niax 5750 Surfactant[2] | 1 |
| Niax A-200 Catalyst[3] | 0.23 |
| T-9 Catalyst[4] | 0.15 |
| Thermolin 101 Flame Retardant[5] | 10 |
| Toluene Diisocyanate | 108 Index |

[1]A glycerin initiated random PO/EO polyol having a hydroxyl number of 48 and containing predominately secondary hydroxyl groups; available from ARCO Chemical Company
[2]Silicone surfactant, made by Union Carbide Corp.
[3]Amine catalyst, made by Union Carbide Corp.
[4]Organotin catalyst, made by Air Products and Chemicals, Inc.
[5]Tetrakis(2-Chloroethyl)Ethylene Diphosphate, made by Olin Corporation

TABLE 1

PREPARATION OF TMI/BA RANDOM COPOLYMERS

| Example # | 1 | 2 | 3 | 4 | 5 | 6 | 7 | 8 | 9 |
|---|---|---|---|---|---|---|---|---|---|
| Monomer Charge, wt. % | 20 | 20 | 20 | 20 | 10 | 20 | 40 | 20 | 20 |
| BA/TMI Weight Ratio | 90/10 | 90/10 | 85/15 | 80/20 | 75/25 | 70/30 | 85/15 | 90/10 | 95/5 |
| Base Polyol | W | W | W | W | W | W | X | X | X |
| % Of Total Polyol in Feed | 75 | 75 | 75 | 75 | 78 | 75 | 83 | 75 | 75 |
| Reaction Temp., °C. | 115 | 115 | 115 | 115 | 115 | 115 | 115 | 115 | 115 |
| Initiator Conc., Wt. % | 0.5 | 0.5 | 0.5 | 0.5 | 0.25 | 0.5 | 0.75 | 0.5 | 0.5 |
| Feed Addition Time, h | 1.5 | 1.5 | 1.5 | 1.5 | 1.5 | 1.5 | 1.5 | 1.5 | 1.5 |
| Reactor Charge, g | | | | | | | | | |
| Base Polyol | 200 | 400 | 200 | 400 | 200 | 400 | 100 | 200 | 200 |
| Feed, g | | | | | | | | | |
| Butyl Acrylate | 180 | 360 | 170 | 320 | 75 | 280 | 340 | 180 | 190 |
| TMI | 20 | 40 | 30 | 80 | 25 | 120 | 60 | 20 | 10 |
| Initiator | 5 | 10 | 5 | 10 | 2.5 | 10 | 7.5 | 5 | 5 |
| Base Polyol | 600 | 1200 | 600 | 1200 | 700 | 1200 | 500 | 600 | 600 |
| Copolymer Properties | | | | | | | | | |
| Overall Monomer Conv., % | 87.9 | 96.6 | 88.3 | 93.2 | 77.3 | 77.6 | | 89.3 | 91.6 |
| Viscosity, cps | 885 | 840 | 1200 | 790 | 570 | 665 | 40,795 | 2110 | 2010 |
| % NCO | | | | | | | | | |
| Theor. | 0.42 | 0.42 | 0.63 | 0.84 | 0.52 | 1.25 | 1.25 | 0.42 | 0.21 |
| Found | 0.44 | 0.43 | 0.63 | 0.83 | 0.48 | 1.26 | 0.90 | 0.40 | 0.19 |

TABLE 2
PREPARATION OF DISPERSANTS BY THE IN/SITU METHOD

| Example # | 10 | 11 | 12 | 13 | 14 | 15 | 16 | 17 | 18 |
|---|---|---|---|---|---|---|---|---|---|
| Copolymer From Example | 1 | 1 | 2 | 3 | 3 | 4 | 6 | 9 | 8 |
| Initial Copolymer Level, Wt. % | 20 | 20 | 20 | 20 | 20 | 20 | 20 | 20 | 20 |
| BA/TMI Weight Ratio | 90/10 | 90/10 | 90/10 | 85/15 | 85/15 | 80/20 | 70/30 | 95/5 | 90/10 |
| Base Polyol | W | W | W | W | W | W | W | X | X |
| Dilution | No | Yes | No | No | Yes | Yes | Yes | No | Yes |
| Copolymer Level after Dilution, Wt. % | 20 | 15 | 20 | 20 | 13 | 9 | 6.5 | 20 | 10 |
| Viscosity after Dilution, cps | 840 | 770 | 885 | 1200 | — | 700 | 585 | 2010 | — |
| Initial % NCO | 0.44 | 0.27 | 0.43 | 0.63 | 0.38 | 0.38 | 0.41 | 0.19 | 0.20 |
| Reactor Charge, g | | | | | | | | | |
| Copolymer | 200 | 200 | 200 | 272 | 150 | 200 | 211 | 172 | 152 |
| Additional Polyol | 0 | 67 | 0 | 0 | 81 | 244 | 433 | 0 | 154 |
| Catalyst | | | | | | | | | |
| Type | UL1 | UL1 | T9 | UL1 | T9 | T9 | T9 | T9 | T9 |
| Amount, g | 2 | 2 | 0.57 | 2 | 0.66 | 0.73 | 0.88 | 1 | 1 |
| Dispersant Properties | | | | | | | | | |
| Viscosity, cps | 8200 | 1950 | 7580 | gel | 33420 | 5555 | 7960 | 11130 | 9850 |
| Wt. % NCO | 0.02 | 0.04 | 0.02 | — | 0.01 | 0.02 | 0.02 | 0.03 | 0.02 |
| GPC, % > 100K MW | 22 | 11 | 23 | — | 15 | 15 | 18 | 19 | 18 |

TABLE 3
POLYMER POLYOL DISPERSIONS PREPARED USING DISPERSANTS OBTAINED BY THE IN SITU METHOD

| Example # | 19 | 20 | 21 | 22 |
|---|---|---|---|---|
| Monomer Charge, Wt. % | 40 | 40 | 40 | 30 |
| S/AN Weight Ratio | 75/25 | 75/25 | 75/25 | 75/25 |
| Base Polyol | W | W | W | Y |
| Dispersant #, Example # | 10 | 18 | 17 | 17 |
| Dispersant, % of Total Polyol | 3 | 3 | 3 | 4.6 |
| % of Total Polyol in Feed | 89 | 89 | 89 | 90 |
| Initial dispersant Conc. % | 22.5 | 22.5 | 22.5 | 46.4 |
| Reaction Temp., °C. | 120 | 120 | 120 | 120 |
| Initiator Conc., Wt. % | 0.9 | 0.9 | 0.9 | 0.375 |
| Feed Addition Time, h | 2 | 2 | 2 | 2 |
| Reactor Charge, g | | | | |
| Base Polyol | 124 | 124 | 124 | 75 |
| Dispersant | 36 | 36 | 36 | 65 |
| Feed, g | | | | |
| Styrene | 600 | 600 | 600 | 450 |
| Acrylonitrile | 200 | 200 | 200 | 150 |
| Initiator | 18 | 18 | 18 | 7.5 |
| Base Polyol | 1040 | 1040 | 1040 | 1260 |
| Dispersion Properties | | | | |
| Overall Monomer Conv., % | 97.2 | 97.5 | 96.6 | 96.4 |
| Viscosity, cps (25° C.) | 4830 | 4780 | 4860 | 3465 |
| Particle Size, μ | 0.69 | 0.85 | 0.92 | 0.71 |
| Centrifugable Solids, Wt. % | 3.5 | 4.2 | 5.9 | 2.6 |

TABLE 4
POLYMER POLYOL DISPERSIONS PREPARED USING DISPERSANTS OBTAINED BY THE BLEND METHOD

| Example # | 25 | 26 |
|---|---|---|
| Monomer Charge, Wt. % | 40 | 20 |
| S/AN Weight Ratio | 75/25 | 100/0 |
| Base Polyol | W | W |
| Dispersant, Example # | 24 | 24 |
| % Dispersant of Total Polyol | 3 | 8 |
| % of Total Polyol in Feed | 73 | 90 |
| Initial Dispersant Conc. % | 11.3 | 80 |
| Reaction Temp., °C. | 120 | 120 |
| Initiator Conc., Wt. % | 0.9 | 0.75 |
| Feed Addition Time, h | 2 | 2 |
| Reactor Charge, g | | |
| Base Polyol | 284 | 32 |
| Dispersant | 36 | 128 |
| Feed, g | | |
| Styrene | 600 | 400 |
| Acrylonitrile | 200 | 0 |
| Initiator | 18 | 15 |
| Base Polyol | 880 | 1440 |
| Dispersion Properties | | |
| Overall Monomer Conv., % | 97.0 | 90.1 |
| Viscosity, cps | 4760 | 1260 |
| Particle Size, μ | 0.77 | 2.1 |
| Centrifugable Solids, Wt. % | 5.1 | 20.0 |

We claim:

1. A process for producing a polymer polyol composition which comprises reacting a first polyoxyalkylene polyol, a vinyl monomer, and a grafted polyol-polyacrylate dispersant in the presence of a free radical polymerization initiator, wherein the grafted polyol-polyacrylate dispersant is comprised of
   (a) a random copolymer, soluble in the first polyoxyalkylene polyol, of
      (i) an isocyanate vinyl monomer; and
      (ii) an acrylate monomer; and
   (b) a second polyoxyalkylene polyol; wherein the random copolymer and the second polyoxyalkylene polyol are connected through at least one urethane graft site and wherein the grafted polyolpolyacrylate dispersant is employed in an amount effective to enhance the stability of the polymer polyol composition as compared to the stability of the polymer polyol composition in the absence of the grafted polyolpolyacrylate dispersant.

2. The process of claim 1 wherein the isocyanate vinyl monomer is a hindered isocyanate vinyl monomer.

3. The process of claim 1 wherein the acrylate monomer is a $C_1$–$C_5$ alkyl acrylate.

4. The process of claim 1 wherein the vinyl monomer is selected from the group consisting of monovinyl aromatic monomers, unsaturated nitrile monomers, and mixtures thereof.

5. The process of claim 1 wherein the weight ratio of isocyanate vinyl monomer: acrylate monomer is from about 0.5:99.5 to 50:50.

6. A process for producing a polymer polyol composition comprising the steps of:

(a) copolymerizing
  (i) an isocyanate vinyl monomer and
  (ii) an acrylate monomer; in the presence of an amount of a first portion of a free radical polymerization initiator effective to form a random copolymer wherein the isocyanate group of the isocyanate vinyl monomer is predominantly unreacted;
(b) reacting the random copolymer with a first portion of a polyoxyalkylene polyol miscible with the random copolymer in the presence of an amount of a urethane-forming catalyst effective to accomplish substantially complete reaction of the isocyanate group and to form a grafted polyol-polyacrylate dispersant;
(c) reacting the grafted polyol-polyacrylate dispersant, a second portion of a polyoxyalkylene polyol, and a vinyl monomer in the presence of an amount of a second portion of a free radical polymerization initiator effective to form the polymer polyol composition, said grafted polyol-polyacrylate dispersant being employed in an amount effective to enhance the stability of the polymer polyol composition as compared to the stability of the polymer polyol composition in the absence of the grafted polyol-polyacrylate dispersant.

7. The process of claim 6 wherein the polymer polyol composition is diluted after step (c) with a third portion of a polyoxyalkylene polyol.

8. The process of claim 6 wherein copolymerization step (a) is carried out in the presence of the first portion of the polyoxyalkylene polyol.

9. The process of claim 6 wherein the vinyl monomer is selected from the group consisting of monovinyl aromatic monomers, unsaturated nitrile monomers, and mixtures thereof.

10. The process of claim 6 wherein the weight ratio of vinyl monomer: polyoxyalkylene polyol in step (b) is from about 1:19 to 1:1.

11. The process of claim 6 wherein the grafted polyolpolyacrylate dispersant is employed in an amount of from about 0.1 to 20 weight percent based on the total weight of the polymer polyol composition.

* * * * *